US009982077B2

(12) United States Patent
Bellehumeur et al.

(10) Patent No.: US 9,982,077 B2
(45) Date of Patent: May 29, 2018

(54) HIGH DENSITY ROTOMOLDING RESIN

(71) Applicant: NOVA Chemicals (International) S.A., Fribourg (CH)

(72) Inventors: Celine Bellehumeur, Calgary (CA); Mark Hoidas, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 11 days.

(21) Appl. No.: 15/368,893

(22) Filed: Dec. 5, 2016

(65) Prior Publication Data
US 2017/0158789 A1 Jun. 8, 2017

(30) Foreign Application Priority Data

Dec. 8, 2015 (CA) ...................................... 2914166

(51) Int. Cl.
| | |
|---|---|
| C08L 23/06 | (2006.01) |
| B29C 45/00 | (2006.01) |
| C08F 10/02 | (2006.01) |
| C08F 210/16 | (2006.01) |
| C08F 110/02 | (2006.01) |
| C08F 110/14 | (2006.01) |
| C08L 23/04 | (2006.01) |

(52) U.S. Cl.
CPC .......... C08F 210/16 (2013.01); C08F 110/02 (2013.01); C08F 110/14 (2013.01); C08L 23/04 (2013.01); *C08F 2500/01* (2013.01); *C08F 2500/07* (2013.01); *C08L 2205/025* (2013.01); *C08L 2205/03* (2013.01)

(58) Field of Classification Search
CPC ...... C08L 23/06; C08L 23/08; C08L 23/0815; C08L 2205/025; C08F 2/001; C08F 10/02; C08F 210/16
See application file for complete search history.

(56) References Cited

U.S. PATENT DOCUMENTS

| | | | |
|---|---|---|---|
| 5,132,380 A | 7/1992 | Stevens et al. | |
| 5,198,401 A | 3/1993 | Turner et al. | |
| 5,292,845 A | 3/1994 | Kawasaki et al. | |
| 5,844,029 A | 12/1998 | Prabhu et al. | |
| 6,448,341 B1 | 9/2002 | Kolthammer et al. | |
| 7,790,826 B2 | 9/2010 | Wilson et al. | |
| 7,803,629 B2 | 9/2010 | DesLauriers et al. | |
| 8,022,143 B2 | 9/2011 | Wang | |
| 8,101,693 B2 | 1/2012 | Van Asseldonk et al. | |
| 8,653,191 B2 * | 2/2014 | Ansems | C08F 8/32 525/125 |
| 9,371,442 B2 * | 6/2016 | Wang | C08L 23/06 |
| 2003/0065097 A1* | 4/2003 | DeGroot | C08F 10/00 525/240 |
| 2010/0261848 A1* | 10/2010 | Wang | B29C 45/0001 525/240 |
| 2013/0072632 A1* | 3/2013 | Wang | C08L 23/08 525/53 |
| 2014/0179873 A1* | 6/2014 | Lam | C08L 23/06 525/240 |

FOREIGN PATENT DOCUMENTS

WO 2005/121239 A2 12/2005

OTHER PUBLICATIONS

Randall, James C.; Journal of Macromolecular Science. Reviews in Macromolecular Chemistry and Physics; A Review of High Resolution Liquid 13-Carbon Nuclear Magnetic Resonance Characterizations of Ethylene-Based Polymers; JMS—Rev. Macromol. Chem. Phys., C29(2 & 3) (1989), pp. 285.
Deslauriers, Paul J. and Rohlfing, David C.; Estimating Slow Crack Growth Performance of Polyethylene Resins from Primary Structures such as Molecular Weight and Short Chain Branching; Macromolecular Symposium, 2009, 282, pp. 136-149.
ASTM D 792-00; Standard Test Methods for Density and Specific Gravity (Relative Density) of Plastics by Displacement; Copyright ASTM International; Current edition approved Dec. 10, 2000. Published Mar. 2001. Originally published as D 792-44. Last previous edition D 792-98. pp. 1-6.
ASTM D 6645-01 (Reapproved 2010); Standard Test Method for Methyl (Comonomer) Content in Polyethylene by Infrared Spectrophotometry; Copyright ASTM International; Current edition approved Jan. 1, 2010. Published Jan. 2010. Originally approved in 2001. Last previous edition approved in 2001 as D6645-01. pp. 1-4.
ASTM D 638-10; Standard Test Method for Tensile Properties of Plastics; Copyright ASTM International; Current edition approved May 15, 2010. Published Jun. 2010. Originally approved in 1941. Last previous edition approved in 2008 as D 638-08. pp. 1-16.
ASTM D 790-10; Standard Test Methods for Flexural Properties of Unreinforced and Reinforced Plastics and Electrical Insulating Materials; Copyright Astm International; Current edition approved Apr. 1, 2010. Published Apr. 2010. Originally approved in 1970. Last previous edition approved in 2007 as D790-07. pp. 1-11.
ASTM D 5628-10; Standard Test Method for Impact Resistance of Flat, Rigid Plastic Specimens by Means of a Falling Dart (Tup or Falling Mass); Copyright ASTM International; Current edition approved Jul. 1, 2010. Published Jul. 2010. Originally approved in 1994. Last previous edition approved in 2007 as D5628-07. pp. 1-10.
ASTM D 1693-12; Standard Test Method for Environmental Stress-Cracking of Ethylene Plastics; Copyright ASTM International; Current edition approved Apr. 1, 2012. Published May 2012. Originally approved in 1959. Last previous edition approved in 2008 as D1693-08. pp. 1-11.
ASTM D 646-13; Standard Test Method for Mass Per Unit Area of Paper and Paperboard of Aramid Papers (Basis Weight); Copyright ASTM International; Current edition approved Jul. 1, 2013. Published Aug. 2013. Originally approved in 1941. Last previous edition approved in 2007 as D646-96 (2007) which was withdrawn Feb. 2010 and reinstated in Jul. 2013. pp. 1-2.

(Continued)

*Primary Examiner* — Robert Harlan
(74) *Attorney, Agent, or Firm* — Julie L. Heinrich

(57) ABSTRACT

The present disclosure provides high density polyethylene resins having good low temperature impact resistance. The resins are suitable for use in rotomolding application for large parts. The resin is a bi- or trimodal resin produced using solution phase polymerization in the presence of a single site catalyst.

16 Claims, 10 Drawing Sheets

(56) References Cited

OTHER PUBLICATIONS

ASTM D 1238-13; Standard Test Method for Melt Flow Rates of Thermoplastics by Extrusion Plastometer; Copyright ASTM International; Current edition approved Aug. 1, 2013. Published Aug. 2013. Originally approved in 1965. Last previous edition approved in 2010 as D1238-10. pp. 1-16.

* cited by examiner

HIGH DENSITY ROTOMOLDING RESIN

The present disclosure relates to rotomolding polyethylene resins having a density of around 0.950 g/cc having good stiffness. There do not appear to be any commercial rotomolding resins in this density range. Products made from the resin have competitive physical properties.

There are a number of different considerations for manufacturing a resin suitable for use in rotomolding manufacture. The resin needs to be: capable of production at commercially acceptable rates of production; suitable for use in the rotomolding process (e.g. for example having a suitable sintering temperature and a suitable cooling rate to be removed from the mold) and finally must have suitable properties for the end use application. One important property sought is low temperature impact resistance. Another important property sought is environmental stress crack resistance. The resin should not develop cracks due to exposure to chemicals, sunlight, etc. in applications such as tank sprayers for agricultural use, cisterns, and smaller rotomolded parts.

U.S. Pat. No. 7,790,826, issued Sep. 7, 2010 to Davis et al., assigned to Dow Global Technologies Inc. teaches a resin useful in compression molding useful to manufacture caps for bottled water or carbonated drinks. The disclosure does not teach or suggest resins suitable for use in rotational molding applications.

U.S. Pat. No. 6,448,341, issued Sep. 10, 2002 to Kolthammer et al., assigned to Dow the Dow Chemical Company teaches a blend of solution polymers which is useful in rotational molding. An essential feature of the patent is one of the components has a density of less than 0.908 g/cc. There is no component in the polyethylene disclosed herein having a density less than 0.908 g/cc. Additionally the polymers of Kolthammer have an MI ($I_2$) from about 3 to 100 g/10 min. The polymers disclosed herein have an MI ($I_2$) from about 1.0 to 1.5 g/10 min.

The present disclosure seeks to provide a higher density resin suitable for rotomolding applications having enhanced stiffness and low warpage.

In one embodiment, the present disclosure provides a polyethylene resin comprising less than 1.5 weight % of 1-octene and the balance ethylene, having a density from 0.948 to 0.953 g/cc, a melt index determined according to ASTM1238 under a load of 2.16 kg at a temperature of 190° C. ($I_2$) from 1.0 to 1.5 g/10 minutes; a melt index determined according to ASTM1238 under a load of 21.6 kg at a temperature of 190° C. ($I_{21}$) from 32 to 55 g/10 minutes; a weight average molecular weight (Mw) determined by gel permeation chromatography (GPC) from 95,000 to 120,000; a number average molecular weight determined by gel permeation chromatography (GPC) from 20,000 to 40,000; a z average molecular weight (Mz) from 240,000 to 360,000; an Mw/Mn from 2.5 to 4.5; an Mz/Mw from 2.5 to 3.5; and having a CBDI (50) from 80 to 95, a degree of residual unsaturation less than 0.22 per 1000 carbon atoms, for example between 0.06 to 0.22, the molecular weight distribution determined by GPC of said polymer being deconvoluted into at least two components comprising:

from 20 to 40 weight % of a first component having a calculated weight average molecular weight (Mw) being from 200,000 to 250,000; a calculated number average molecular weight (Mn) from 90,000 to 140,000; a z average molecular weight (Mz) from 390,000 to 520,000 and an estimated density from 0.921 to 0.930 g/cc;

from 40 to 70 weight % of a second component having a calculated weight average molecular weight (Mw) being from 20,000 to 57,000; a calculated number average molecular weight (Mn) from 10,000 to 30,000; a z average molecular weight (Mz) from 30,000 to 80,000 and an estimated density from 0.948 to 0.953 g/cc, provided that the density difference between component two and component one is less 0.030 g/cc.

In a further embodiment, the composition comprises a third component having a calculated weight average molecular weight (Mw) being from 60,000 to 130,000; a calculated number average molecular weight (Mn) from 30,000 to 65,000; a z average molecular weight (Mz) from 90,000 to 180,000, and an estimated density from 0.935 to 0.945 g/cc, for example from 0.938 to 0.943 g/cc.

In a further embodiment, the polyethylene resin has a flex secant modulus 1% from 1200 to 1300 MPa.

In a further embodiment, the polyethylene resin has a mean failure energy of not less than 150 ft·lb and a ductility of greater than 80% as measured using low temperature ARM impact performance testing.

In a further embodiment, the polyethylene resin has an environmental stress crack resistance of not less than 330 hours when measured at ESCR conditions A100 100% CO-630 and B100 100% CO-630.

In a further embodiment, the polyethylene resin comprises not less than 0.6 weight % of 1-octene.

In a further embodiment, the polyethylene resin has an Mw/Mn from 2.5 to 4.5.

In a further embodiment, the polyethylene resin has an Mz/Mw from 2.5 to 3.5.

In a further embodiment, the first component is present in an amount from 20 to 40 weight % of the total polymer composition.

In a further embodiment, the second component is present in an amount from 40 to 70 weight % of the total polymer composition.

In a further embodiment, the present disclosure provides a rotomolded part using the above resin.

DETAILED DESCRIPTION

Numbers Ranges

Figure 1:
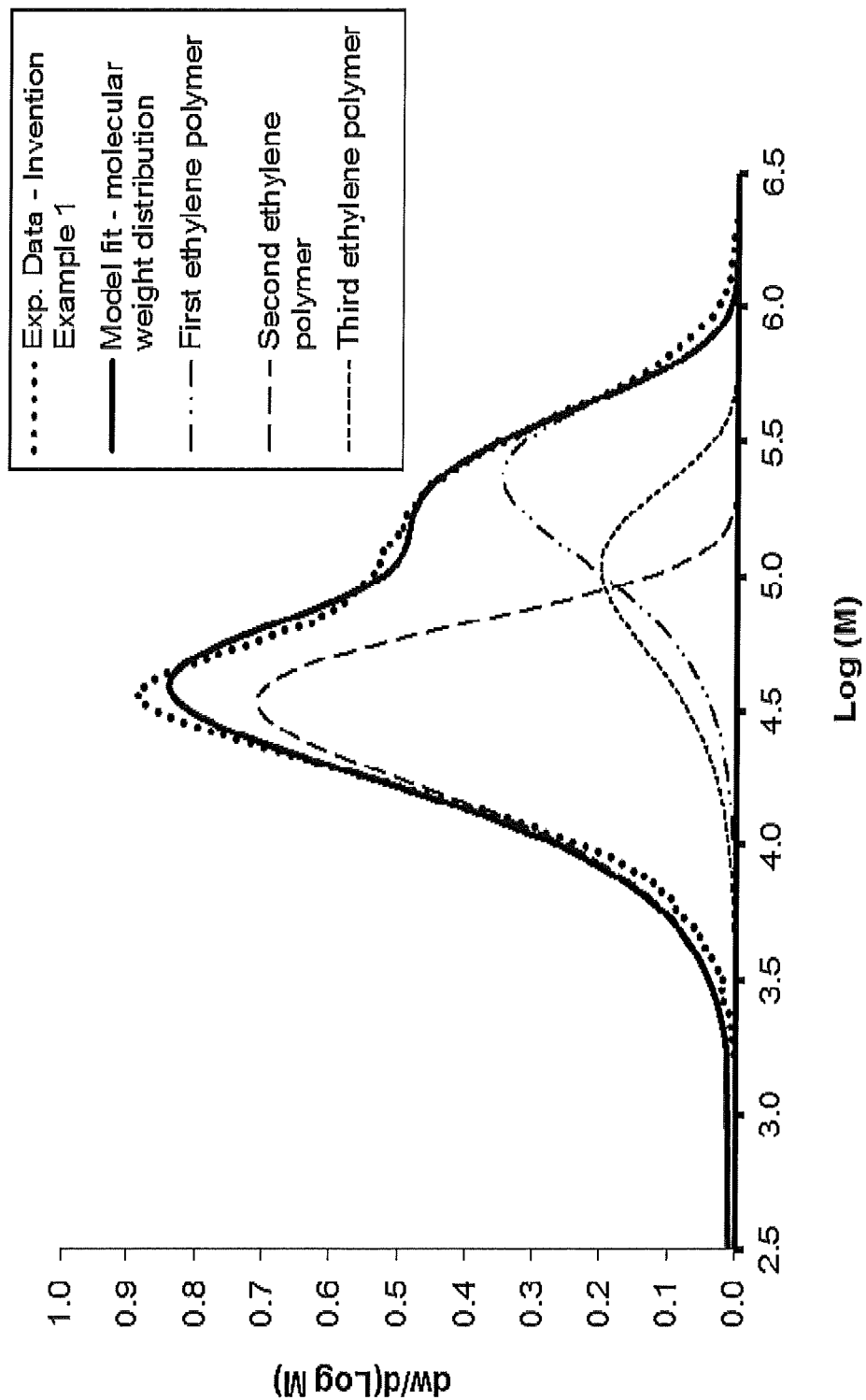
FIG. 1 is a plot of the molecular weight distribution obtained by GPC of the polymer of invention example 1 and the computer model predictions of the molecular weight distributions of the first, second and third ethylene polymers that are comprised in the polymer of invention example 1.
Figure 2:
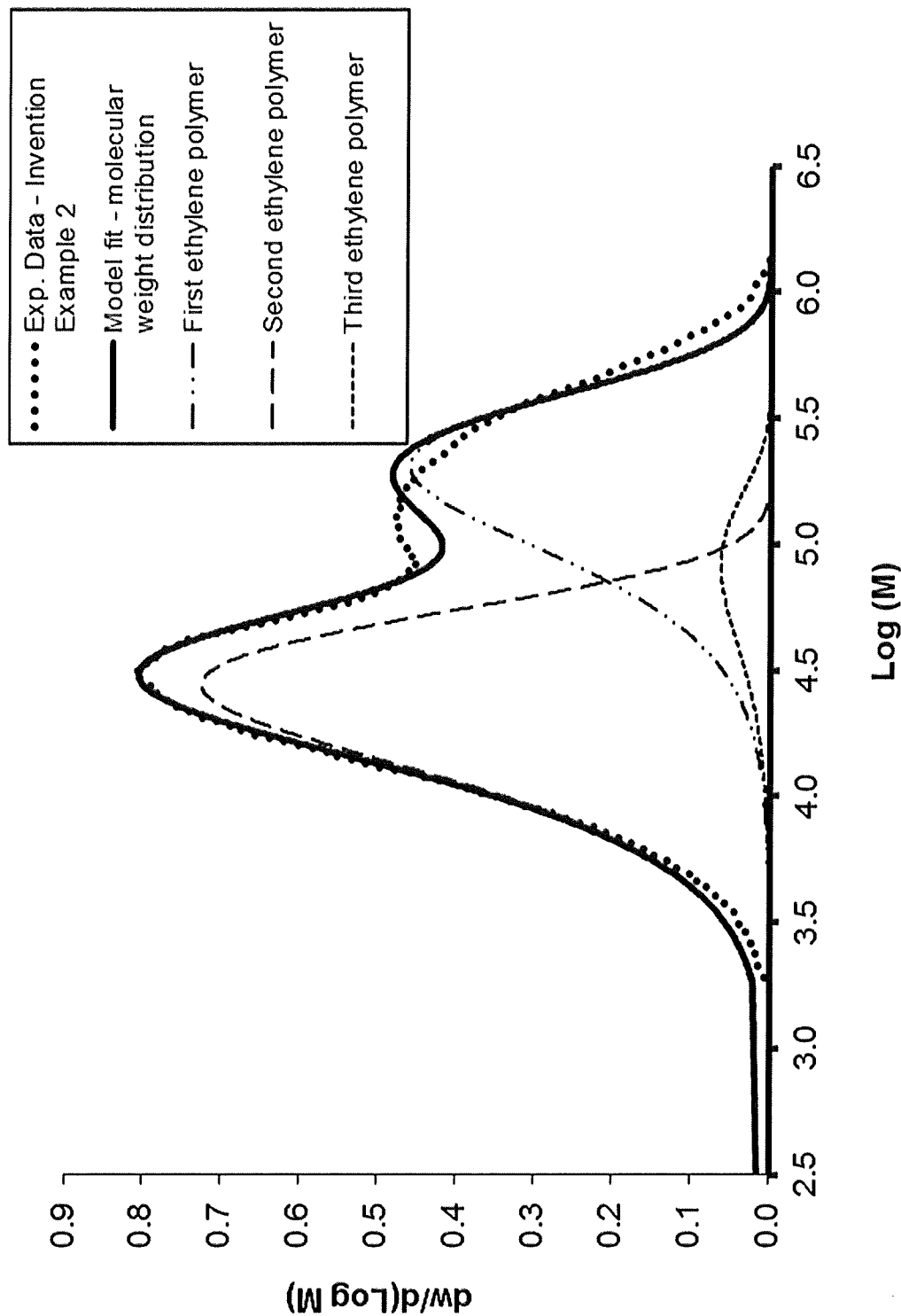
FIG. 2 is a plot of the molecular weight distribution obtained by GPC of the polymer of invention example 2 and the computer model predictions of the molecular weight distributions of the first, second and third ethylene polymers that are comprised in the polymer of invention example 2.
Figure 3:
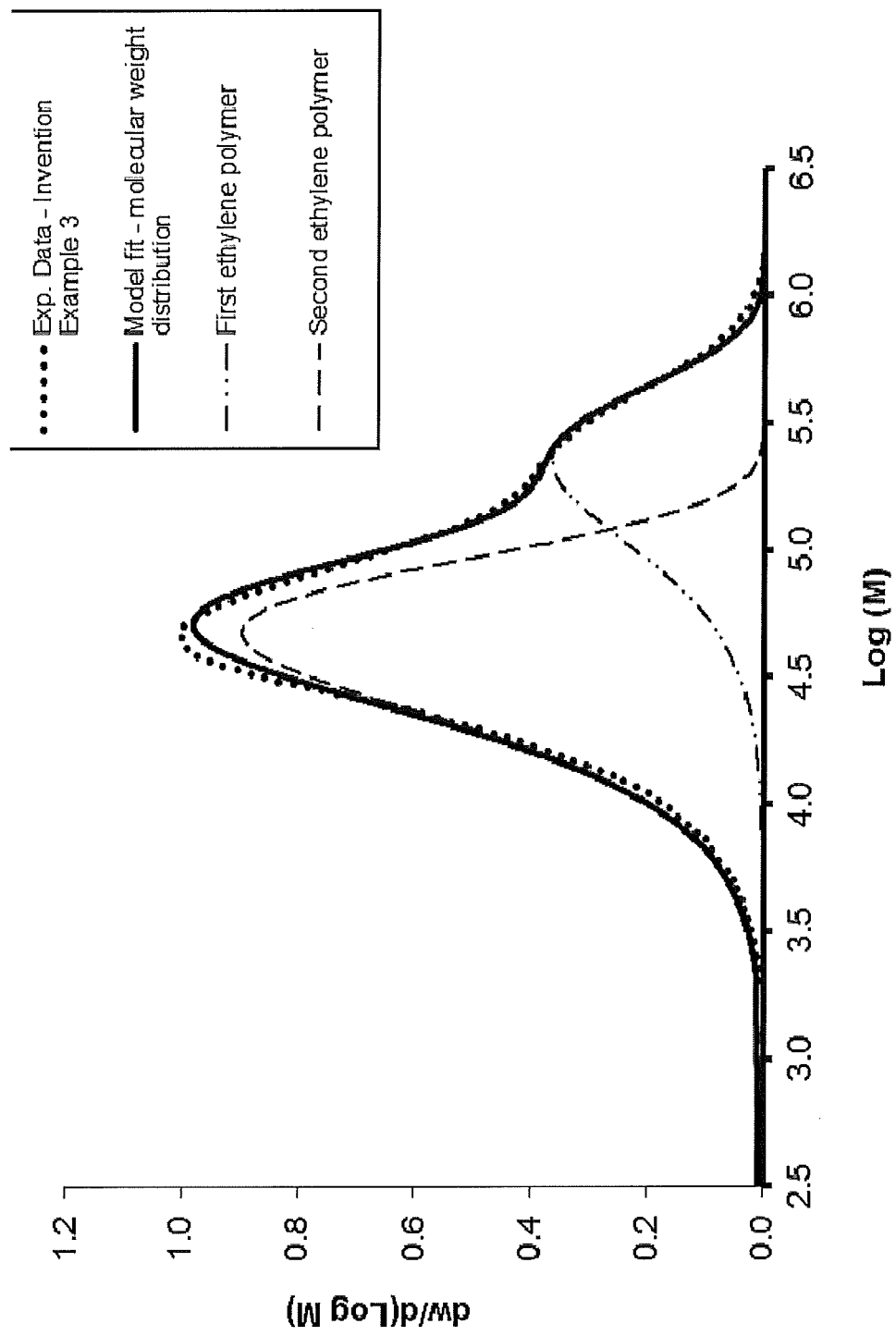
FIG. 3 is a plot of the molecular weight distribution obtained by GPC of the polymer of invention example 3 and the computer model predictions of the molecular weight distributions of the first and second ethylene polymers that are comprised in the polymer of invention example 3.

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the properties that the present disclosure desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

The polymers disclosed herein are made using a process as described in U.S. Pat. No. 8,101,693, issued Jan. 24, 2012 in the name of Van Asseldonk et al., assigned to NOVA Chemicals (International) S.A. the text of which is herein incorporated by reference.

The process uses two CSTR reactors followed by a tubular reactor.

The temperature of the reactor(s) in a high temperature solution process is from about 80° C. to about 300° C., for example from about 120° C. to 250° C. The upper temperature limit will be influenced by considerations that are well known to those skilled in the art, such as a desire to maximize operating temperature (so as to reduce solution viscosity), while still maintaining good polymer properties (as increased polymerization temperatures generally reduce the molecular weight of the polymer). In some embodiments, the upper polymerization temperature will for example be between 200 and 300° C. In some embodiments the reaction process is a "medium pressure process", meaning that the pressure in the reactor(s) is for example less than about 6,000 psi (about 42,000 kiloPascals or kPa). Example pressures are from 10,000 to 40,000 kPa (1450-5800 psi), or for example from about 14,000-22,000 kPa (2,000 psi to 3,000 psi).

In some reaction schemes, the pressure in the reactor system should be high enough to maintain the polymerization solution as a single phase solution and to provide the necessary upstream pressure to feed the polymer solution from the reactor system through a heat exchanger system and to a devolatilization system. Other systems permit the solvent to separate into a polymer rich and polymer lean stream to facilitate polymer separation.

The solution polymerization process may be conducted in a stirred "reactor system" comprising one or more stirred tank reactors or in one or more loop reactors or in a mixed loop and stirred tank reactor system. The reactors may be in tandem or parallel operation. In some embodiments, in a dual tandem reactor system, the first polymerization reactor preferably operates at lower temperature. The residence time in each reactor will depend on the design and the capacity of the reactor. In some embodiments, the reactors should be operated under conditions to achieve a thorough mixing of the reactants.

In some embodiments, the solution polymerization process uses at least two polymerization reactors in series. The polymerization temperature in the first reactor is from about 80° C. to about 180° C. (for example from about 120° C. to 160° C.) and the second reactor is preferably operated at a higher temperature (up to about 220° C.). In some embodiments the reaction process is a "medium pressure process", meaning that the pressure in each reactor is, for example, less than about 6,000 psi (about 42,000 kilopascals or kPa), or for example from about 2,000 psi to 3,000 psi (about 14,000 22,000 kPa).

The term "tubular reactor" is meant to convey its conventional meaning—namely a simple tube. The tubular reactor disclosed herein will have a length/diameter (L/D) ratio of at least 10/1. The tubular reactor is not agitated. For example, the tubular reactor is operated adiabatically. Thus, as polymerization progresses, the remaining comonomer is increasingly consumed and the temperature of the solution increases (both of which improve the efficiency of separating the remaining comonomer from the polymer solution). In some embodiments the temperature increase along the length of the tubular reactor is greater than 3° C. (i.e., that the discharge temperature from the tubular reactor is at least 3° C. greater than the discharge temperature from the CSTR that feeds the tubular reactor).

The tubular reactor used herein has a feed port for additional ethylene and solvent. The feed is "tempered"— i.e., the temperature of the additional ethylene and/or solvent is heated to above ambient (for example to about 100° C.) but the temperature is below the discharge temperature of the tubular reactor. In some embodiments, the ethylene is tempered to between 100 and 200° C. In some embodiments, the ethylene is added with solvent.

The amount of solvent (expressed as a weight ratio, based on ethylene) is, for example, from 20/1 to 0.1/1, or for example from 10/1 to 1/1.

Optionally, the tubular reactor may also have feed ports for additional catalyst, cocatalyst, comonomer and/or telomerization agent (such as hydrogen). However, in some embodiments, no additional catalyst is added to the tubular reactor.

The total volume of the tubular reactor is, for example, at least 10 volume % of the volume of the at least one CSTR, or for example from 30% to 200% (for clarity, if the volume of the CSTR is 1000 liters, then the volume of the tubular reactor is at least 100 liters and is, for example, from 300 to 2000 liters).

The total amount of ethylene added to the tubular reactor is, for example, from 1 to 50 weight % of the total ethylene added to the CSTR(s). For example, if one CSTR is being operated with an ethylene flow rate of 1000 kg/hr, then the ethylene flow to the tubular reactor would be from 10 to 500 kg/hr. Similarly, if two CSTR(s) were being operated with an ethylene flow of 1000 kg/hr to the first and 500 kg/hr to the second, then the flow of ethylene to the tubular reactor would be from 15 to 750 kg/hr.

Overall, the resulting polymer or polyethylene resin comprising less than 1.5, in one embodiment more than 0.6, in a further embodiment from 0.7 to 1.2 weight % of 1-octene and the balance ethylene, having a density from 0.948 to 0.953, a melt index determined according to ASTM1238 under a load of 2.16 kg at a temperature of 190° C. ($I_2$) from 1.0 to 1.5 g/10 minutes, in some embodiments from 1.1 to 1.3 g/10 minutes; a melt index determined according to ASTM1238 under a load of 21.6 kg at a temperature of 190° C. ($I_{21}$) from 32 to 55 g/10 minutes in some embodiments from 36 to 50 g/10 minutes; a weight average molecular weight (Mw) determined by gel permeation chromatography from 95,000 to 120,000, in some embodiments, from 100,000 to 115,000; a number average molecular weight (Mn) determined by gel permeation chromatography from 20,000 to 40,000 in some embodiments from 25,000 to 35,000; a z average molecular weight (Mz) from 240,000 to 360,000 in some embodiments from 260,000 to 325,000; an Mw/Mn from 2.3 to 4.5, in an alternate embodiment from 2.7 to 4.3; an Mz/Mw from 2.5 to 3.5; and having a CBDI (50) from 80 to 95; a degree of residual unsaturation less than 0.22 per 1000 carbon atoms, for example between 0.06 to 0.22, in some embodiments less than 20.

In addition, the resin when molded into parts or plaques has the following properties:

an environmental stress crack resistance of not less than 330 hours when measured at ESCR conditions A 100 100% CO-630 and B100 100% CO-630; a flex secant modulus 1% from greater than 1200, in some embodiments from 1200 to 1300 MPa; a mean failure energy of not less than 150 ft·lb; and a ductility greater than 80% as measured using low temperature ARM impact performance testing; and a primary structure parameter (PSP2) of less than 8, for example from about 2 to 7, or for example from 2.5 to 5.

The PSP2 calculation as outlined by DesLauriers and Rohlfing in Macromolecular Symposia (2009), 282 (Polyolefin Characterization-ICPC 2008), pages 136-149 is incorporated by reference herein. The PSP2 calculation can be generally described as a multistep process. The first step involves estimating the homopolymer (or low comonomer polymer) density of a sample from the sample's molecular weight distribution as described by Equation 1. The first step takes into account the effects of molecular weight on sample density.

$$1/\rho = \Sigma(w_i/\rho_i) = \int 1/\rho(dw/d\,\text{Log}\,M)d\,\text{Log}\,M \quad \text{(Eq. 1)}$$

where: $\rho = 1.0748 - (0.0241)\text{Log}\,M$.

Density values at molecular weights less than 720 g/mol are equal to 1.006 g/cm³ according to this method. In the second step, to further account for the added contributions to density suppression by the presence of short chain branching for each molecular weight (MW) slice, the difference between the measured bulk density of copolymer and the calculated homopolymer density is divided by the overall short chain branching (SCB) level (as measured by size exclusion chromatography-Fourier transform infrared spectroscopy or by C13-NMR) and subsequently applied to the SCB level in each MW slice. The original observed bulk density of the copolymer (down to 0.852 g/cm³) is obtained through summation of the MW slices as described above. The calculations have been simplified by assuming that all SCB levels will have the same effect on density suppression. However, it is to be understood that the effectiveness of a particular SCB level to suppress density will vary (i.e., the ability of SCB to disrupt crystallinity decreases as the level of SCB increases). Alternately, if the density of the copolymer is not known, then the effects of SCB on sample density can be estimated in the second step by using Equation 2 as described by DesLauriers and Rohlfing in U.S. Patent Application Publication No. 2007/0298508, issued as U.S. Pat. No. 7,803,629, where the change in density $\Delta\rho$ refers to the value that is subtracted from the value given in equation 1 on a molecular slice by slice basis.

$$\Delta\rho = C_1(\text{SCB}/PDI^n)^{C_2} - C_3(\text{SCB}/PDI^n)^{C_4} \quad \text{(Eq. 2)}$$

In Equation 2, $C_1$=1.25E-02, $C_2$=0.5, $C_3$=7.51E-05, $C_4$=0.62 and n=0.32.

The third step in calculating PSP2 is to calculate the quantity of $2\,I_c + I_a$ where $I_c$ is the estimated crystalline lamella thickness (in nm) and $I_a$ is the estimated thickness (in nm) of the amorphous material at a particular molecular weight given by the following equations:

$$T_m(°\,\text{C.}) = (20587.5149640828)\rho^3 - (63826.2771547794)\rho^2 + (65965.7028912473) - 22585.2457979131 \quad \text{(Eq 3.)}$$

$$l_c(\text{nm}) = \frac{0.624\,\text{nm}\cdot T_m^0(K)}{T_m^0(K) - T_m(K)} \quad \text{(Eq. 4)}$$

In equation 3, assigned values of 20° C. and 142.5° C. are given for density values of 0.852 g/cm³ and 1.01 g/cm³, respectively. Equation 4 is a form of the well accepted Gibbs Thompson equation. The thickness of the amorphous layer ($I_a$) is calculated using the equations 5a and 5b:

$$w_c = \left(\frac{\rho_c}{\rho}\right)\left(\frac{\rho - \rho_a}{\rho_c - \rho_a}\right) \quad \text{(Eq. 5a)}$$

$$l_a = \rho_c l_c (1 - w_c)/\rho_a w_c \quad \text{(Eq. 5b)}$$

where: $w_c$=weight fraction crystallinity
$\rho$=calculated density of MW slice
$\rho_c$=density of 100% crystalline sample (assigned 1.006 g/cm³)
$\rho_a$=density of amorphous phase (0.852 g/cm³)

The fourth step calculates the tie molecule probability (P) for each molecular weight and respective $2\,I_c + I_a$ value according to equations 6a and 6b:

$$P = \frac{1}{3}\frac{\int_L^\infty r^2 \exp(-b^2 r^2)dr}{\int_0^\infty r^2 \exp(-b^2 r^2)dr} \quad \text{(Eq. 6a)}$$

-continued where $b^2 = \dfrac{3}{2\bar{r}^2}$ and $\bar{r}^2 = (Dnl^2)$.

The symbols above have the following meanings:
P=Probability of tie-chain formation
L=Critical distance (nm)=2 $l_c+l_a$
D=Chain extension factor in melt=6.8 for polyethylene
n=Number of links=$M_w/14$ for polyethylene
l=The link length=0.153 nm for polyethylene $$P = \frac{1}{3}\frac{\frac{\sqrt{\pi}}{4b^3} - \int_0^L r^2 \exp(-b^2 r^2) dr}{\frac{\sqrt{\pi}}{4b^3}} \quad \text{(Eq. 6b)}$$

$$= \frac{1}{3}\left(1 - \frac{4b^3}{\sqrt{\pi}}\int_0^L r^2 \exp(-b^2 r^2) dr\right)$$

Finally, PSP2 values are calculated from Equations 6a and 6b by treating this value as a weighing factor ($P_i$) for each slice of the MWD, where $P_i$ was arbitrarily multiplied×100 and subsequently defined as $PSP2_i$. As in all of the aforementioned calculations, this value at each slice is multiplied by the respective weight fraction ($w_i$) of the MWD profile in order to obtain a value for the bulk polymer.

Figure 4:
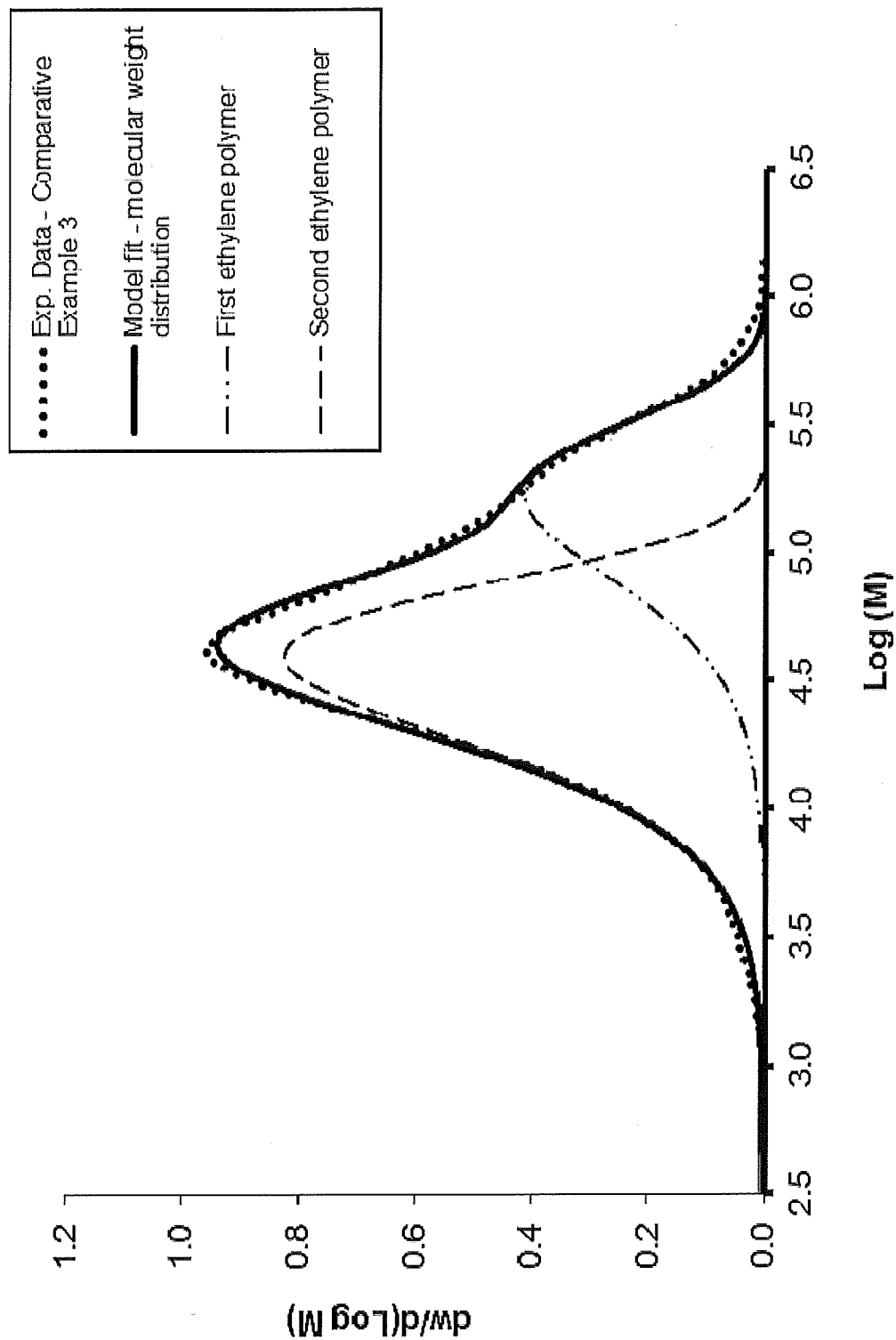
FIG. 4 is a plot of the molecular weight distribution obtained by GPC of the polymer of comparative example 3 and the computer model predictions of the molecular weight distributions of the first, and second ethylene polymers that are comprised in the polymer of comparative example 3.
Figure 5:
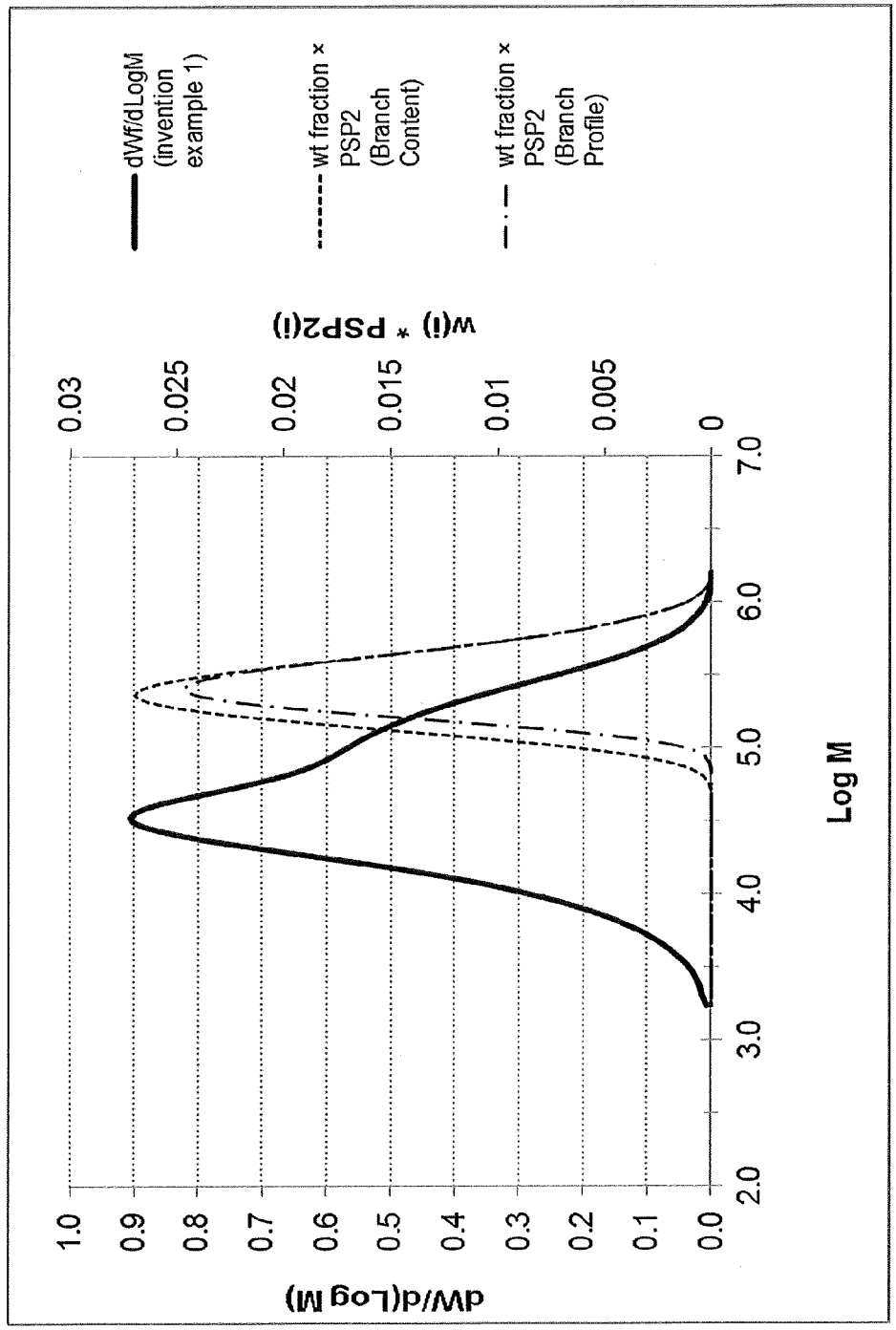
FIG. 5 is a plot of the calculated $w_i \cdot PSP2_i$ values against log M for the inventive example 1, which can also be insightful when attempting understand and predict structure property relationships. The area underneath the resulting $w_i \cdot PSP2_i$ vs. log M curve defines PSP2 for the whole polymer sample.
Figure 6:
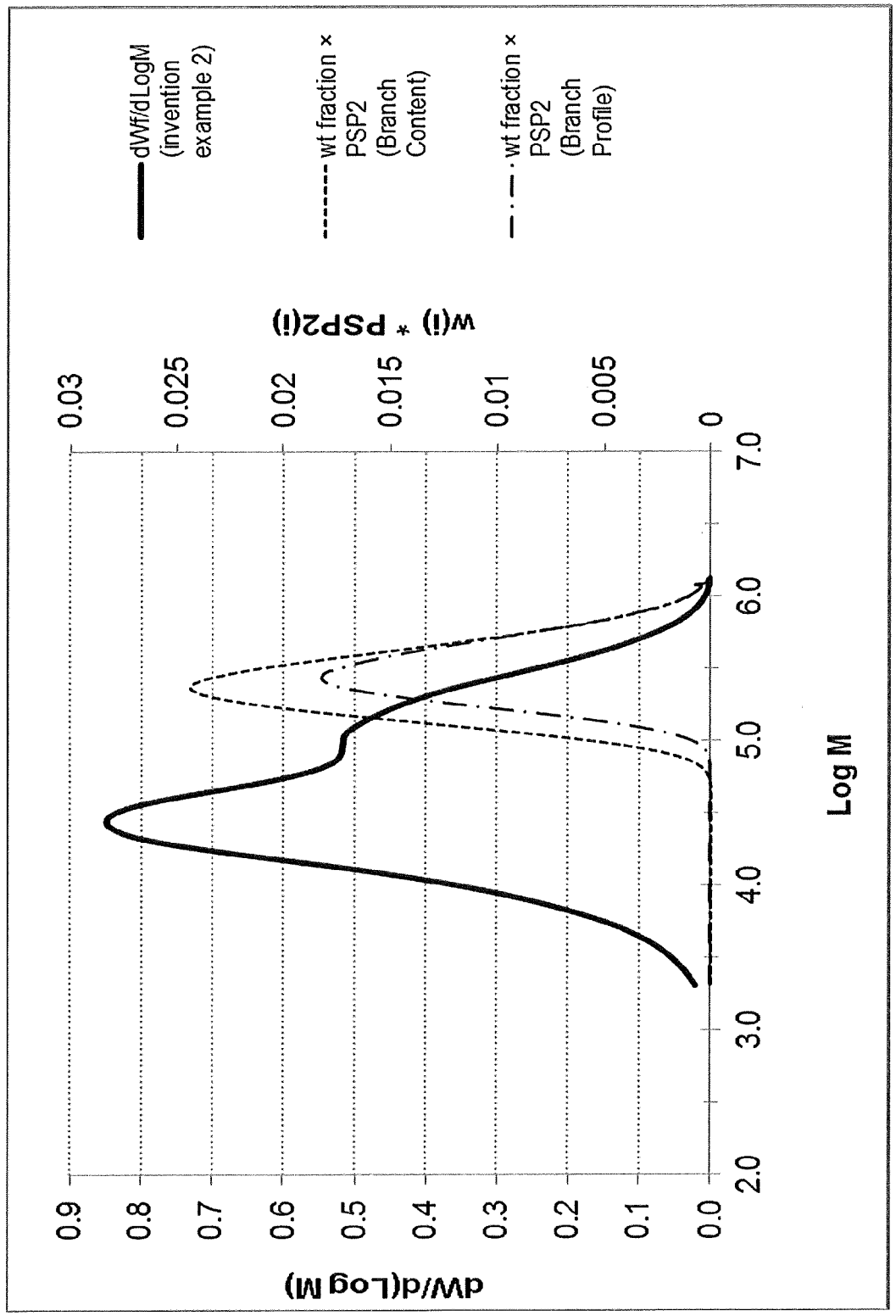
FIG. 6 is a plot of the calculated $w_i \cdot PSP2_i$ values against log M for the inventive example 2.
Figure 7:
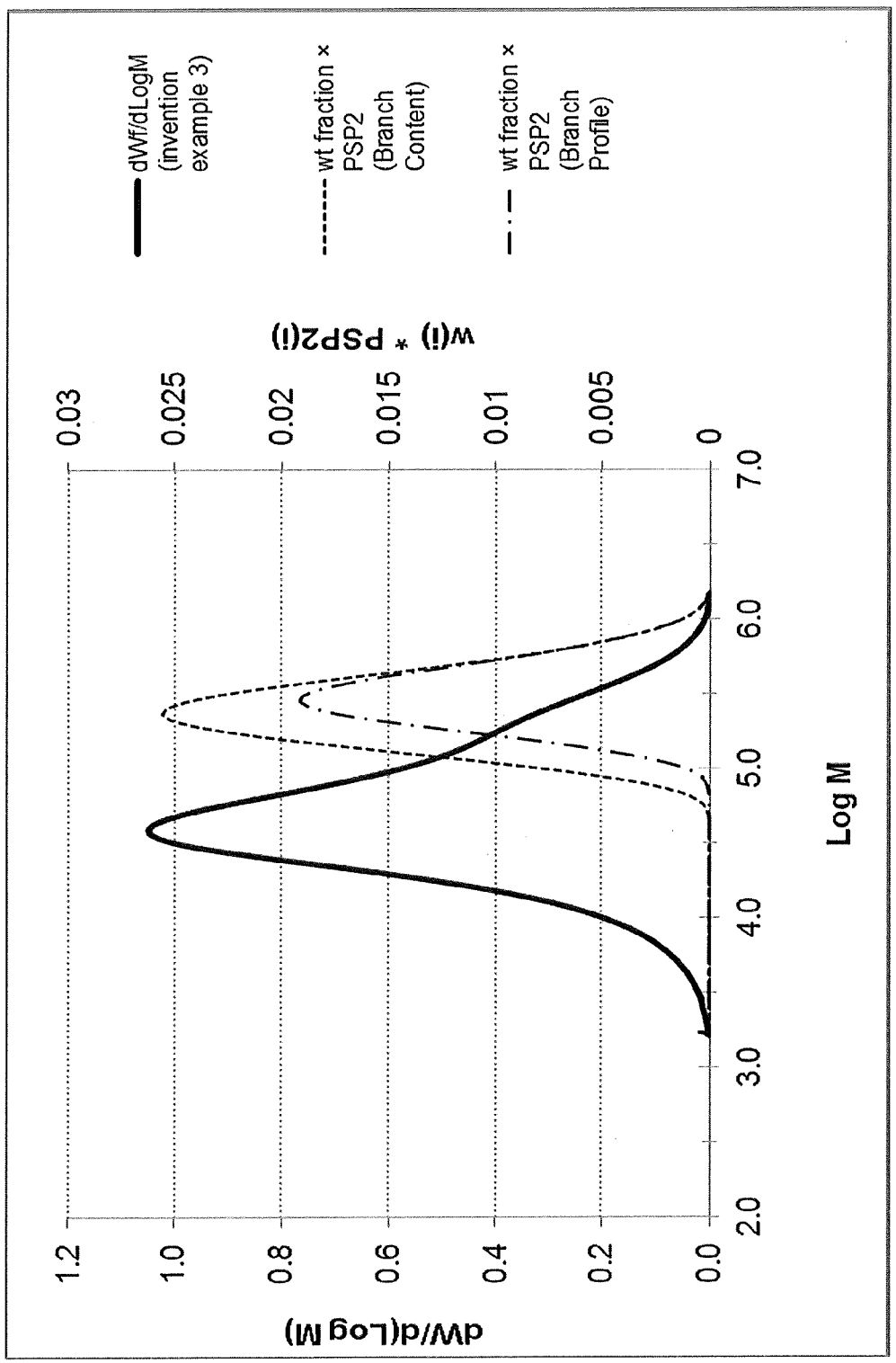
FIG. 7 is a plot of the calculated $w_i \cdot PSP2_i$ values against log M for the inventive example 3.
Figure 8:
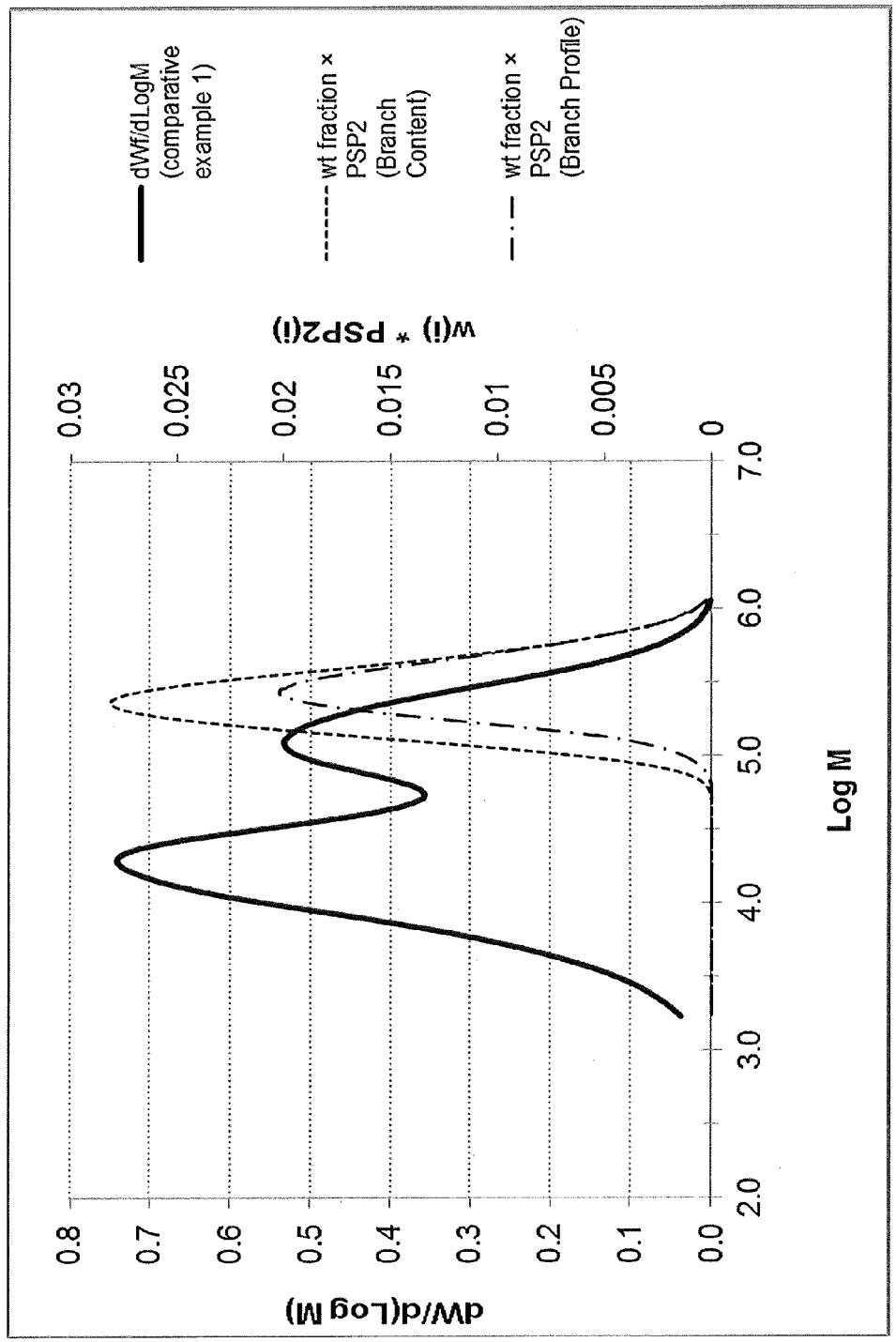
FIG. 8 is a plot of the calculated $w_i \cdot PSP2_i$ values against log M for comparative example 1.
Figure 9:
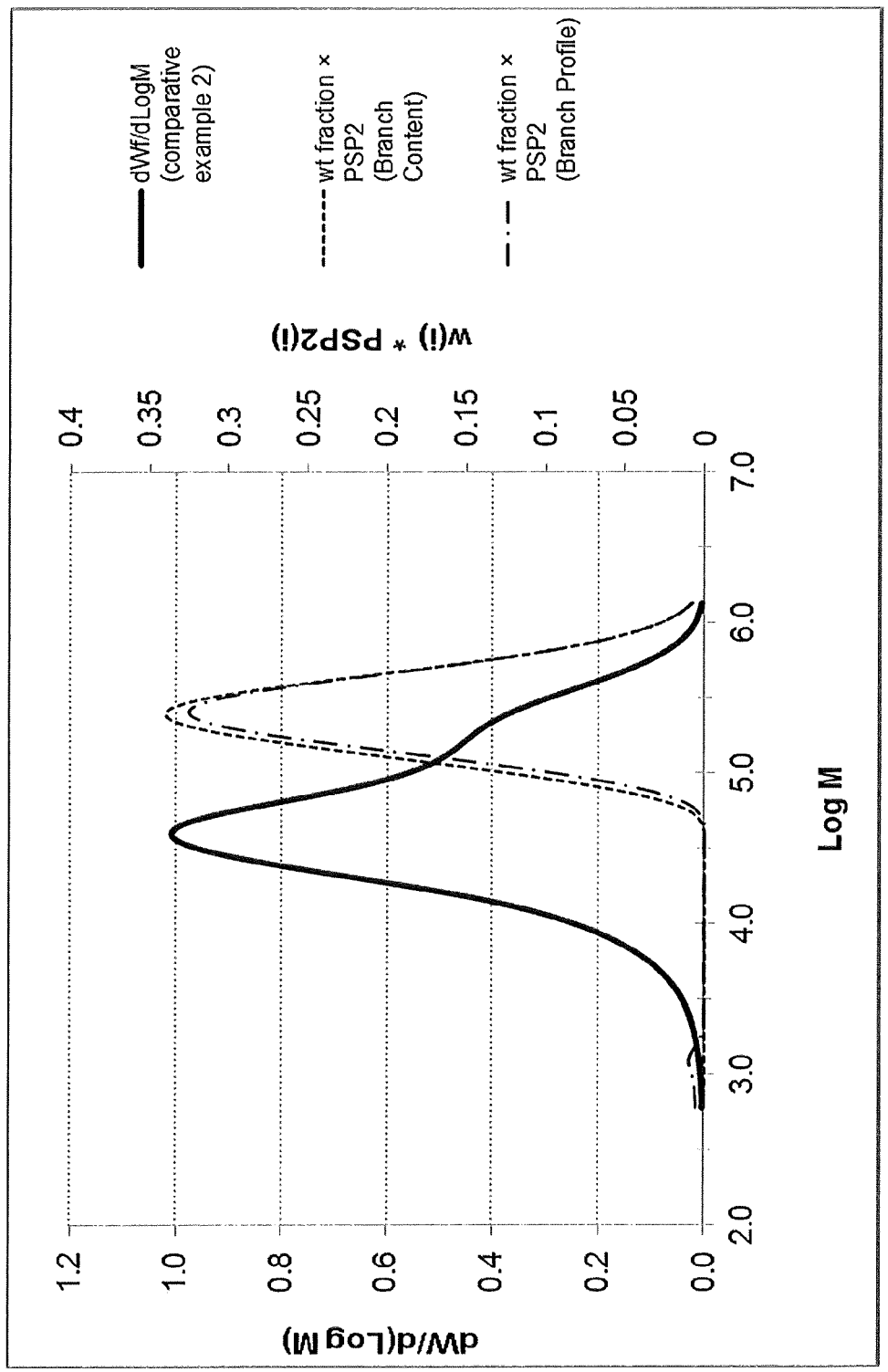
FIG. 9 is a plot of the calculated $w_i \cdot PSP2_i$ values against log M for comparative example 2.
Figure 10:
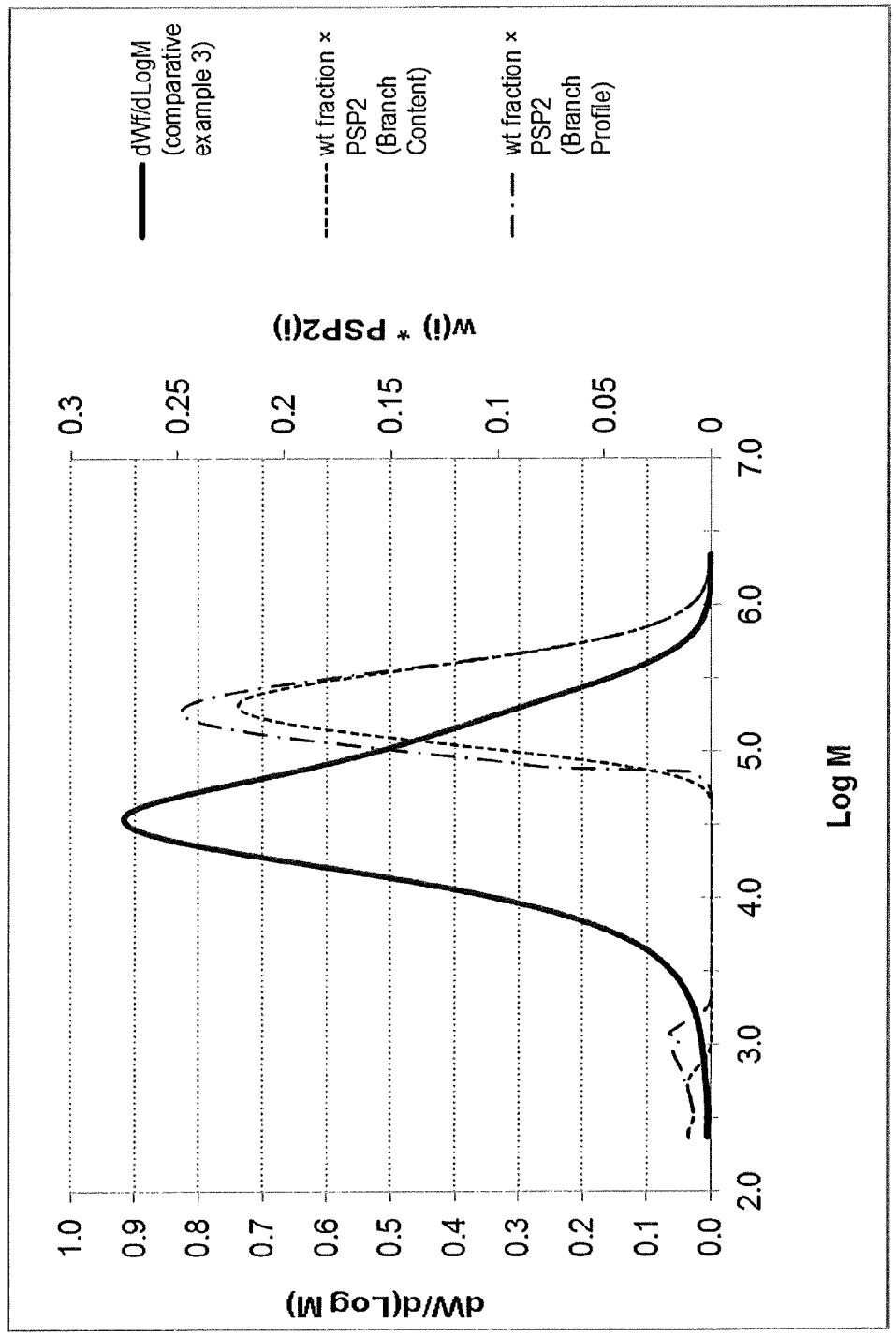
FIG. 10 is a plot of the calculated $w_i \cdot PSP2_i$ values against log M for comparative example 3.

Plots of the calculated $w_i \cdot PSP2_i$ values against log M for the inventive examples and comparative examples are shown in FIGS. 4 to 9, respectively, which can also be insightful when attempting understand and predict structure property relationships. The area underneath the resulting $w_i \cdot PSP2_i$ vs. log M curve defines PSP2 for the whole polymer sample.

As noted above the resin is produced in a process using two CSTR's in series followed by a tubular reactor (after burner). As such the gel permeation chromatograph (GPC) of the resin may be mathematically deconvoluted into three components.

The first component is a high molecular weight lowest density component. This component is made in the first CSTR at the lowest temperature. The density of the component is estimated to be from 0.921 to 0.930 g/cc, in an alternate embodiment from 0.921 to 0.925 g/cc. The component is present in an amount from 20 to 40, in an alternative embodiment from 25 to 40 weight % of the total polymer. The component has a calculated weight average molecular weight (Mw) being from 170,000 to 265,000; a calculated number average molecular weight (Mn) from 90,000 to 140,000; a z average molecular weight (Mz) from 390,000 to 520,000. This first component has a calculated Mw/Mn from about 1.9 to 2.2, for example 1.9 to 2.1. This first component has a calculated Mz/Mw from 1.4 to 1.6, in an alternate embodiment 1.5. The first component has a calculated short chain (i.e., six carbon chains) branch frequency of about 1.8 per 1000 carbon atoms.

The second component is a lower molecular weight highest density component. This component is made in the second CSTR at the highest temperature the second CSTR. The density of the component is estimated to be from 0.948 to 0.953 g/cc, in an alternate embodiment from 0.949 to 0.952 g/cc, provided that the density difference between component two and component one is less than 0.030 g/cc. The component is present in an amount from 40 to 70, in an alternative embodiment from 60 to 80 weight % of the total polymer. The component has a calculated weight average molecular weight (Mw) being from 20,000 to 57,000; a calculated number average molecular weight (Mn) from 10,000 to 27,000; a z average molecular weight (Mz) from 30,000 to 72,000. This second component has a calculated Mw/Mn from about 1.7 to 2.2, for example from 1.9 to 2.1. This second component has a calculated Mz/Mw from 1.4 to 1.6, in an alternate embodiment 1.5. The second component has a calculated short chain (i.e., six carbon chains) branch frequency less than 0.5 per 1000 carbon atoms. The calculated difference in density between the first component and second component is 0.025 to 0.030 g/cc.

The third component is an intermediate molecular weight and density. This component is made in the tubular reactor at high temperature. The density of the component is calculated to be from 0.935 to 0.945 g/cc, in an alternate embodiment from 0.938 to 0.942 g/cc. In this embodiment, the third component comprises the balance of the polymer, for example from about 3 to about 20 weight % of the composition, in some embodiments from 3 to 17 weight % of the composition. The component has a calculated weight average molecular weight (Mw) being from 60,000 to 130,000; a calculated number average molecular weight (Mn) from 30,000 to 65,000; a z average molecular weight (Mz) from 90,000 to 180,000. This third component has a calculated Mw/Mn from about 1.9 to 2.1, or for example about 2. This third component has a calculated Mz/Mw from 1.4 to 1.6, in an alternate embodiment 1.5.

The polymer may be made using a solution polymerization process as described above. In the solution polymerization of ethylene with one or more comonomers, for example $C_{3-8}$, for example $C_{4-8}$ alpha olefins, for example hexene or octene, or for example octene, the monomers are, for example, dissolved in an inert hydrocarbon solvent, for example, a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent that is commercially available is "Isopar E" ($C_{8-12}$ aliphatic solvent, Exxon Chemical Co.).

Catalyst and activators are also dissolved in the solvent or suspended in a diluent miscible with the solvent at reaction conditions.

The Catalyst

The catalyst is a compound of the formula

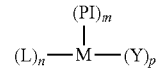

wherein M is selected from Ti, Zr and Hf; PI is a phosphinimine ligand of the formula:

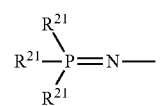

wherein each $R^{21}$ is independently selected from a hydrogen atom; a halogen atom; hydrocarbyl radicals, for example, $C_{1-10}$, which are unsubstituted by or further substituted by a halogen atom; $C_{1-8}$ alkoxy radicals; $C_{6-10}$ aryl or aryloxy radicals; amido radicals; silyl radicals of the formula:

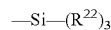

wherein each $R^{22}$ is independently selected from hydrogen, a $C_{1-8}$ alkyl or alkoxy radical and $C_{6-10}$ aryl or aryloxy radicals; and a germanyl radical of the formula:

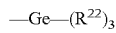

wherein $R^{22}$ is as defined above;
L is a monoanionic cyclopentadienyl-type ligand independently selected from cyclopentadienyl-type ligands, Y is independently selected from activatable ligands;
m is 1 or 2; n is 0 or 1; p is an integer and the sum of m+n+p equals the valence state of M.

Example phosphinimines are those in which each $R^{21}$ is a hydrocarbyl radical, for example a $C_{1-6}$ hydrocarbyl radical, or for example a $C_{1-4}$ hydrocarbyl radical.

The term "cyclopentadienyl" refers to a 5-member carbon ring having delocalized bonding within the ring and typically being bound to the active catalyst site, for example a group 4 metal (M) through $\eta^5$-bonds. The cyclopentadienyl ligand may be unsubstituted or up to fully substituted with one or more substituents selected from $C_{1-10}$ hydrocarbyl radicals which are unsubstituted or further substituted by one or more substituents selected from a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from hydrogen, a $C_{1-8}$ alkyl or alkoxy radical, $C_{6-10}$ aryl or aryloxy radicals; and germanyl radicals of the formula Ge—$(R)_3$ wherein R is as defined above.

In some embodiments, the cyclopentadienyl-type ligand is selected from a cyclopentadienyl radical, an indenyl radical and a fluorenyl radical which radicals are unsubstituted or up to fully substituted by one or more substituents selected from a fluorine atom, a chlorine atom; $C_{1-4}$ alkyl radicals; and a phenyl or benzyl radical which is unsubstituted or substituted by one or more fluorine atoms.

Activatable ligands Y may be selected from a halogen atom, $C_{1-4}$ alkyl radicals, $C_{6-20}$ aryl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals. In some embodiments, Y is selected from a chlorine atom, a methyl radical, an ethyl radical and a benzyl radical.

Suitable phosphinimine catalysts are Group 4 organometallic complexes which contain one phosphinimine ligand (as described above) and one cyclopentadienyl-type (L) ligand and two activatable ligands. The catalysts are not bridged.

Activators

The activators for the catalyst are selected, for example, from aluminoxanes and ionic activators.

Alumoxanes

Suitable alumoxane may be of the formula: $(R^4)_2AlO(R^4AlO)_mAl(R_4)_2$ wherein each $R^4$ is independently selected from $C_{1-20}$ hydrocarbyl radicals and m is from 0 to 50, for example $R^4$ is a $C_{1-4}$ alkyl radical and m is from 5 to 30. Methylalumoxane (or "MAO") in which each R is methyl is an example alumoxane. Alumoxanes are well known as cocatalysts, particularly for metallocene-type catalysts. Alumoxanes are also readily available articles of commerce. The use of an alumoxane cocatalyst generally uses a molar ratio of aluminum to the transition metal in the catalyst from 20:1 to 1000:1. In some embodiments the ratios are from 50:1 to 250:1.

Commercially available MAO typically contains free aluminum alkyl (e.g. trimethylaluminum or "TMA") which may reduce catalyst activity and/or broaden the molecular weight distribution of the polymer. If a narrow molecular weight distribution polymer is required, in some embodiments such commercially available MAO is treated with an additive which is capable of reacting with the TMA. Alcohols are some examples useful (with hindered phenols being another example) for this purpose.

"Ionic Activators" Cocatalysts

So-called "ionic activators" are also well known for metallocene catalysts. See, for example, U.S. Pat. No. 5,198,401 (Hlatky and Turner) and U.S. Pat. No. 5,132,380 (Stevens and Neithamer).

Whilst not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion permits olefin polymerization to proceed at the cationic catalyst center presumably because the non-coordinating anion is sufficiently labile to be displaced by monomer which coordinates to the catalyst. Example ionic activators are boron-containing ionic activators described in (i) (iii) below:

(i) compounds of the formula $[R^5]^+[B(R^7)_4]^-$ wherein B is a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from a hydrogen atom and a $C_{1-4}$ alkyl radical; and (ii) compounds of the formula $[(R^8)_t ZH]^+[B(R^7)_4]^-$ wherein B is a boron atom, H is a hydrogen atom, Z is a nitrogen atom or phosphorus atom, t is 2 or 3 and $R^8$ is selected from $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula $B(R^7)_3$ wherein $R^7$ is as defined above.

In the above compounds in some embodiments $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include: triethylammonium tetra(phenyl)boron; tripropylammonium tetra(phenyl)boron; tri(n-butyl)ammonium tetra(phenyl)boron; trimethylammonium tetra(p-tolyl)boron; trimethylammonium tetra(o-tolyl) boron; tributylammonium tetra(pentafluorophenyl)boron; tripropylammonium tetra(o,p-dimethylphenyl)boron; tributylammonium tetra(m,m-dimethylphenyl)boron; tributylammonium tetra(p-trifluoromethylphenyl)boron; tributylammonium tetra(pentafluorophenyl)boron; tri(n-butyl) ammonium tetra(o-tolyl)boron; N,N-dimethylanilinium tetra(phenyl)boron; N,N-diethylanilinium tetra(phenyl)boron; N,N-diethylanilinium tetra(phenyl)n-butylboron, N,N-

2,4,6-pentamethylanilinium tetra(phenyl)boron; di-(isopropyl)ammonium tetra(pentafluorophenyl)boron; dicyclohexylammonium tetra(phenyl)boron, triphenylphosphonium tetra(phenyl)boron; tri(methylphenyl)phosphonium tetra(phenyl)boron; tri(dimethylphenyl)phosphonium tetra(phenyl)boron; tropillium tetrakispentafluorophenyl borate; triphenylmethylium tetrakispentafluorophenyl borate; benzene (diazonium) tetrakispentafluorophenyl borate; tropillium phenyltrispentafluorophenyl borate; triphenylmethylium phenyltrispentafluorophenyl borate; benzene (diazonium) phenyltrispentafluorophenyl borate; tropillium tetrakis (2,3,5,6-tetrafluorophenyl) borate; triphenylmethylium tetrakis (2,3,5,6-tetrafluorophenyl) borate; benzene (diazonium) tetrakis (3,4,5-trifluorophenyl) borate; tropillium tetrakis (3,4,5-trifluorophenyl) borate; benzene (diazonium) tetrakis (3,4,5-trifluorophenyl) borate; tropillium tetrakis (1,2,2-trifluoroethenyl) borate; triphenylmethylium tetrakis (1,2,2-trifluoroethenyl) borate; benzene (diazonium) tetrakis (1,2,2-trifluoroethenyl) borate; tropillium tetrakis (2,3,4,5-tetrafluorophenyl) borate; triphenylmethylium tetrakis (2,3,4,5-tetrafluorophenyl) borate; and benzene (diazonium) tetrakis (2,3,4,5-tetrafluorophenyl) borate.

Readily commercially available ionic activators include: N,N-dimethylaniliniumtetrakispentafluorophenyl borate; triphenylmethylium tetrakispentafluorophenyl borate; and trispentafluorophenyl borane.

The ionic activator may be use at about molar equivalents of boron to group IV metal in the catalyst. Suitable molar ratios of group IV metal from the catalyst to boron may range from 1:1 to 3:1, for example from 1:1 to 1:2.

In some instances, the ionic activator may be used in combination with an alkylating activator (which may also serve as a scavenger). The alkylating activator may be selected from $(R^3)_p MgX_{2-p}$ wherein X is a halide and each $R^3$ is independently selected from $C_{1-10}$ alkyl radicals and p is 1 or 2; $R^3Li$ wherein in $R^3$ is as defined above, $(R^3)_q ZnX_{2-q}$ wherein $R^3$ is as defined above, X is halogen and q is 1 or 2; $(R^3)_s AlX_{3-s}$ wherein $R^3$ is as defined above, X is halogen and s is an integer from 1 to 3. For example in the above compounds $R^3$ is a $C_{1-4}$ alkyl radical, and X is chlorine. Commercially available compounds include triethyl aluminum (TEAL), diethyl aluminum chloride (DEAC), dibutyl magnesium $((Bu)_2Mg)$, and butyl ethyl magnesium (BuEtMg or BuMgEt).

If the phosphinimine catalyst is activated with a combination of ionic activators (e.g., boron compounds) and alkylating agent the molar ratio of group IV metal from the catalyst:metalloid (boron) from the ionic activator:metal from the alkylating agent may range from 1:1:1 to 1:3:10, for example from 1:1.3:5 to 1:1.5:3.

The resulting polymer solution is stripped of residual monomers and pelletized. In some embodiments, during the pelletization process conventional additives such as antioxidants, heat and light stabilizers and process aids are added to the polymer.

The resulting polymer may be compounded with conventional additives including the following types:

Diphosphite

As used herein, the term diphosphite refers to a phosphite stabilizer which contains at least two phosphorus atoms per phosphite molecule.

Non-limiting examples of suitable diphosphites and diphosphonites follow: distearyl pentaerythritol diphosphite, diisodecyl pentaerythritol diphosphite, bis(2,4 di-tert-butyl-phenyl) pentaerythritol diphosphite [sold under the Trademark ULTRANOX® 626, by Chemtura Corporation]; bis (2,6-di-tert-butyl-4-methylpenyl) pentaerythritol diphosphite; bisisodecyloxy-pentaerythritol diphosphite, bis (2,4-di-tert-butyl-6-methylphenyl) pentaerythritol diphosphite, bis(2,4,6-tri-tert-butylphenyl) pentaerythritol diphosphite, and bis(2,4-dicumylphenyl)pentaerythritol diphosphite [sold under the Trademarks DOVERPHOS® S9228-T and DOVERPHOS S9228-CT by Dover Chemicals Corporation]. The diphosphite is used in amounts of from 200 ppm to 2,000 ppm, for example from 300 to 1,500 ppm or for example from 400 to 1,000 ppm.

Other Additives

The compositions disclosed herein may optionally include other additives that are conventionally used with polyethylene. A non-limiting list follows.

Acid Neutralizers

Many commercially available polyolefins contain chloride residues. These chloride residues may generate hydrochloric acid, particularly during melt processing operations. Accordingly, an "acid neutralizer" is conventionally included in a polyolefin stabilization package and is, for example, included in the process disclosed herein.

These acid neutralizers may be divided into "Inorganic"—such as zinc oxide, synthetic hydrotalcites and Li, Na, Ca or Al (hydroxy) carbonates; and "Organic"-such as salts of fatty acids or their derivatives including calcium stearate, zinc stearate, calcium lactate and calcium stearoyl lactylate. When employed, these conventional acid neutralizers are used in conventional amounts. In some embodiments a synthetic hydrotalcite (in an amount of from 100 to 1,000 ppm), zinc stearate (in an amount of from 200 to 700 ppm) or calcium stearoyi lactylate (in an amount of from 200 to 700 ppm) is used. A combination of a hydrotalcite with an "organic" acid neutralizer is an example.

HALS

Phenolic Antioxidants

Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6,-tricyclohexyphenol; and 2,6-di-tert-butyl-4-methoxymethylphenol.

Alkylated Hydroquinones

For example, 2,6-di-tert-butyl-4-methoxyphenol; 2,5-di-tert-butylhydroquinone; 2,5-di-tert-amyl-hydroquinone; and 2,6diphenyl-4-octadecyloxyphenol.

Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

Alkylidene-Bisphenols

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzy[)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5- tert-butyl-4-hydroxy2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methylbenzyl)-6-tert-butyl-4-methylphenyl) terephthalate; and other phenolics such as monoacrylate esters of bisphenols such as ethylidiene bis-2,4-di-t-butyl-phenol monoacrylate ester.

Hydroxylamines and Amine Oxides

For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamnine; N-heptadecyl-N-octadecylhydroxylamine; and N,N-dialkylhydroxylamine derived from hydrogenated tallow amine. The analogous amine oxides (as disclosed in U.S. Pat. No. 5,844,029, Prachu et al.) may also be employed.

Care needs to be taken when adding fillers to the polyethylene as these may cause warpage of the molded part.

The polyethylene is for example ground into a fine powder having a size from about 500 to 1000 microns. The powder may be used as is or additional heat and light stabilizers and pigments may be added to the polyethylene. The powder is loaded into a mold, in some embodiments with a release aid. The mold is rotated about two axes of rotation to cause the particles to flow over the entire inner surface of the mold. The particles are heated to a sintering temperature and fuse together and form a continuous surface. The mold is then cooled and opened and the formed part is removed.

The present disclosure will now be illustrated by the following examples.

EXAMPLES

Test Methods

Mn, Mw and Mz (g/mol) were determined by high temperature Gel Permeation Chromatography (GPC) with differential refractive index detection using universal calibration (e.g. ASTM-D646-99). The molecular weight distribution (MWD) is the ratio of the weight average molecular weight (Mw) over the number average molecular weight (Mn).

GPC-FTIR was used to determine the comonomer content as a function of molecular weight. After separation of the polymer by GPC an on-line FTIR measures the concentration of the polymer and methyl end groups. Methyl end groups are used in the branch frequency calculations. Conventional calibration allows for the calculation of a molecular weight distribution.

Mathematical deconvolutions were performed to determine the relative amount of polymer, molecular weight, and comonomer content of the component made in each reactor, by assuming that each polymer component follows a Flory's molecular weight distribution function and it has a homogeneous comonomer distribution across the whole molecular weight range. The uniform comonomer distribution of each resin component, which is the result from the use of a single site catalyst, allowed the estimation of the short chain branching content (SCB), in branches per 1000 carbon atoms for the first and second ethylene polymers, based on the deconvoluted relative amounts of first and second ethylene polymer components in the polyethylene composition, and their estimated resin molecular weight parameters from the above procedure.

The short chain branch frequency (SCB per 1000 carbon atoms) of copolymer samples was determined by Fourier Transform Infrared Spectroscopy (FTIR) as per ASTM D6645-01. A Thermo-Nicolet 750 Magna-IR Spectrophotometer was used for the measurement. FTIR was also used to determine internal, side chain and terminal levels of unsaturation.

Comonomer content can also be measured using 13C NMR techniques as discussed in Randall Rev. Macromol. Chem. Phys., C29 (2&3), p. 285; U.S. Pat. No. 5,292,845 and WO 2005/121239.

Polyethylene composition density (g/cm$^3$) was measured according to ASTM D792.

Melt indexes I2 and I21 for the polyethylene composition were measured according to ASTM D1238.

The density and melt index of the first and second ethylene polymers that comprise the polyethylene composition were determined based on composition models. The following equations were used to calculate the density and melt index I2 (REFERENCE U.S. Pat. No. 8,022,143 B2, by Wang, assigned to NOVA Chemicals and published Sep. 20, 2011):

$$\text{Density} = 0.979863 - 5.95808 \times 10^{-3} \left(\frac{SCB}{1000C}\right)^{0.65} - 3.8133 \times 10^{-4} [\log_{10}(M_n)]^3 - 5.77986 \times 10^{-6} (M_w/M_n)^3 + 5.57395 \times 10^{-3} (M_z/M_w)^{0.25}$$

$$\log_{10}(\text{Melt Index } I_2) = 22.326528 + 3.467 \times 10^{-3} [\log_{10}(M_n)]^3 - 4.322582[\log_{10}(M_w)] - 1.80061 \times 10^{-1} [\log_{10}(M_z)]^2 + 2.6478 \times 10^{-2} [\log_{10}(M_z)]^3$$

where Mn, Mw, Mz, and SCB/1000C are the deconvoluted values of the individual ethylene polymer components, as obtained from the results of the deconvolution described above.

Plaques molded from the polyethylene compositions were tested according to the following ASTM methods: Bent Strip Environmental Stress Crack Resistance (ESCR), ASTM D1693; Flexural properties, ASTM D 790; Tensile properties, ASTM D 638.

Rotomolded parts were prepared in a rotational molding machine sold under the tradename Rotospeed RS3-160 by Ferry Industries Inc. The machine has two arms which rotate about a central axis within an enclosed oven. The arms are fitted with plates which rotate on an axis that is roughly perpendicular to the axis of rotation of the arm. Each arm is fitted with six cast aluminum molds that produce plastic cubes having dimensions of 12.5 inches (31.8 cm)×12.5 inches×12.5 inches. The arm rotation was set to about 8 revolutions per minute (rpm) and the plate rotation was set to about 2 rpm. These molds produce parts having a nominal thickness of about 0.25 inches (0.64 cm) when initially filled with a standard charge of about 3.7 kg of polyethylene resin in powder form (35 US mesh size). The temperature within the enclosed oven was maintained at a temperature of 560° C. The molds and their content were heated for specified period of time. The molds were subsequently cooled in a controlled environment prior to removing the parts. Specimens were collected from the molded parts for density measurements (density as is) and for determining the color rating and whiteness index (color as is). The ARM impact test was performed in accordance with ASTM D5628 at a test temperature of −40° C.

The Resin

Bimodal polyethylene compositions were prepared at a dual reactor pilot plant. In this dual reactor process the content of the first reactor flows into the second reactor, both of which are well mixed. The process operates using continuous feed streams. The catalyst (cyclopentadienyl Ti tri tert.butly phosphimine di chloride) with catalyst was fed to both reactors. The overall production rate was about 90 kg/hr.

The polymer compositions prepared at the pilot plant were stabilized by a conventional additive package prior to carrying out plaque testing and rotomolding trials.

The polymerization conditions are provided in Table 1. The resulting polyethylene compositions are described in Table 2. The properties of the resulting resins are compared to two commercially available rotomolding resins which are referred to as comparative example 1 and 2, respectively. Properties for the first ethylene polymer and the second ethylene polymer were estimated from deconvolution studies carried out on results obtained from GPC and GPC-FTIR. Results are set forth in Table 3. The properties of pressed plaques as well as rotomolded parts made from the polyethylene compositions are provided in Table 4.

TABLE 1

|  | Invention Example 1 | Invention Example 2 | Invention Example 3 | Comparative Example 3 |
|---|---|---|---|---|
| Ethylene split between first reactor (R1), second reactor (R2), and third reactor (R3) | 0.31/0.49/0.20 | 0.35/0.45/0.20 | 0.35/0.65/0 | 0.35/0.65/0 |
| Octene split between first Reactor (R1) and second reactor (R2), and third reactor (R3) | 1/0/0 | 1/0/0 | 1/0/0 | 1/0/0 |
| Octene to ethylene ratio in fresh feed | 0.023 | 0.025 | 0.021 | 0.028 |
| Hydrogen in reactor 1 (ppm) | 0.5 | 0.6 | 0.8 | 1.2 |
| Hydrogen in reactor 2 (ppm) | 8.0 | 11.6 | 4.5 | 6.0 |
| Hydrogen in reactor 3 (ppm) | 0.5 | 0.6 | — | — |
| Reactor 1 temperature (° C.) | 143 | 150 | 143 | 144 |
| Reactor 2 temperature (° C.) | 170 | 170 | 208 | 211 |
| Reactor 3 temperature (° C.) | 184 | 188 | — | — |
| Catalyst feed in reactor 1 (ppm) | 0.11 | 0.09 | 0.10 | 0.10 |
| Catalyst feed in reactor 2 (ppm) | 0.08 | 0.13 | 0.22 | 0.38 |
| Catalyst feed in reactor 3 (ppm) | 0.00 | 0.00 | — | — |

TABLE 2

|  | Invention Example 1 | Invention Example 2 | Invention Example 3 | Comparative Example 1 | Comparative Example 2 | Comparative Example 3 |
|---|---|---|---|---|---|---|
| Density (g/cm³) | 0.9500 | 0.9507 | 0.9480 | 0.9537 | 0.9449 | 0.9483 |
| Melt Index $I_2$ (g/10 min) | 1.1 | 1.1 | 1.2 | 1.6 | 1.7 | 2.0 |
| Melt Index $I_{21}$ (g/10 min) | 4.9 | 5.2 | 5.3 | 7 | 7.5 | 8.7 |
|  | 9.3 |  | 10.1 |  | 15.2 |  |
|  | 40.0 | 49.1 | 38.9 | 79.0 | 65.8 | 64.6 |
| Melt Flow Ratio ($I_{21}/I_2$) | 36.4 | 44.6 | 32.4 | 49.4 | 39.9 | 32.1 |
| Branch Freq/1000C | 1.0 | 1.3 | 1.2 | 1.9 | 2.7 | 1.9 |
| Comonomer ID | octene | octene | octene | octene | octene | octene |
| Comonomer Content (wt %) | 0.8 | 1.0 | 0.9 | 1.5 | 2.1 | 1.5 |
| Internal Unsat/1000C | 0.03 | 0.03 | 0.11 | 0.06 | 0.12 | 0.14 |
| Total Unsat/1000C | 0.08 | 0.07 | 0.19 | 0.15 | 0.20 | 0.25 |
| $M_n$ | 32000 | 26000 | 35000 | 16700 | 28500 | 27000 |
| $M_w$ | 111000 | 105000 | 102000 | 89000 | 89500 | 86000 |
| $M_z$ | 323000 | 303000 | 264000 | 257000 | 250000 | 221500 |
| Polydispersity Index ($M_w/M_n$) | 3.5 | 4.0 | 2.9 | 5.3 | 3.1 | 3.2 |
| Index (Mz/Mw) | 2.9 | 2.9 | 2.6 | 2.9 | 2.8 | 2.6 |
| CDBI-50: | 91.5 | 85.1 | 92.6 | 60.6 | 88.2 | 87.6 |
| PSP2 (based on Branch Content) | 4.5 | 4.6 | 4.5 | 5.0 | 6.2 | 4.1 |
| PSP2 (based on Branch Content) | 3.6 | 3.1 | 2.8 | 3.2 |  |  |

TABLE 3

|  | Invention example 1 | Invention example 2 | Invention example 3 | Comparative example 3 |
|---|---|---|---|---|
| FIRST ETHYLENE POLYMER (Deconvolution Studies) | | | | |
| $M_n$ | 118000 | 101600 | 111200 | 83500 |
| $M_w$ | 236000 | 203200 | 222400 | 167000 |
| Weight fraction (%) | 28% | 37% | 29% | 33% |
| $M_z$ | 472000 | 406400 | 444800 | 334000 |
| Branch Freq/1000 C (SCB1) | 1.7 | 1.7 | 2.0 | 2.3 |
| Density estimate (g/cm³) (d1) | 0.922 | 0.924 | 0.922 | 0.924 |

TABLE 3-continued

| | Invention example 1 | Invention example 2 | Invention example 3 | Comparative example 3 |
|---|---|---|---|---|
| SECOND ETHYLENE POLYMER (Deconvolution Studies) | | | | |
| $M_n$ | 17000 | 13800 | 23700 | 19700 |
| $M_w$ | 34000 | 27600 | 47400 | 39400 |
| Weight fraction (%) | 56% | 58% | 71% | 67% |
| $M_z$ | 51000 | 41400 | 71100 | 59100 |
| Branch Freq/1000 C (SCB2) | 0 | 0 | 0 | 0 |
| Density estimate (g/cm³) (d2) | 0.951 | 0.953 | 0.948 | 0.950 |
| Estimated d2 − d1 (g/cm³) | 0.029 | 0.029 | 0.026 | 0.025 |
| THIRD ETHYLENE POLYMER (Deconvolution Studies) | | | | |
| $M_n$ | 54000 | 41000 | | |
| $M_w$ | 108000 | 82000 | | |
| Weight fraction (%) | 16% | 5% | 0 | 0 |
| $M_z$ | 162000 | 123000 | | |
| Branch Freq/1000 C (SCB2) | 0 | 0 | | |
| Density estimate (g/cm³) (d3) | 0.939 | 0.942 | | |

TABLE 4

| | Invention example 1 | Invention example 2 | Invention example 3 | Comp. example 1 | Comp. example 2 | Comp. example 3 |
|---|---|---|---|---|---|---|
| FLEXURAL PROPERTIES (Plaques) | | | | | | |
| Flex Secant Mod. 1% (MPa) | 1233 | 1292 | 1202 | 1336 | 1005 | 1057 |
| Flex Sec Mod 1% (MPa) Dev. | 33 | 39 | 24 | 28 | 20 | 25 |
| ESCR (Plaques) | | | | | | |
| ESCR Cond. A at 100% (hrs) 100% CO-630 | 331 | 229 | 120 | — | >1000 | 80 |
| ESCR Cond. B at 100% (hrs) 100% CO-630 | 357 | 217 | 112 | 21 | >1000 | 141 |
| Low Temperature (−40° C.) ARM Impact Performance | | | | | | |
| Mean Failure Energy (ft. lb) at optimal conditions | 150 | 170 | 185 | 0 | 188 | 185 |
| Ductility (%) at optimal conditions | 90 | 100 | 92 | 0 | 100 | 100 |
| As is density (g/cm³) at optimal conditions | 0.9496 | 0.9539 | 0.952 | 0.955 | 0.9464 | 0.9488 |
| Appearance | Flat surfaces | Flat surfaces | Flat surfaces | Warpage | Flat surfaces | Flat surfaces |

What is claimed is:

1. A polyethylene resin comprising less than 1 weight % of 1-octene and the balance ethylene, having a density from 0.948 to 0.953 g/cc, a melt index determined according to ASTM1238 under a load of 2.16 kg at a temperature of 190° C. ($I_2$) from 1.0 to 1.5 g/10 minutes; a melt index determined according to ASTM1238 under a load of 21.6 kg at a temperature of 190° C. ($I_{21}$) from 32 to 55 g/10 minutes; a weight average molecular weight (Mw) determined by gel permeation chromatography from 90,000 to 130,000; a number average molecular weight (Mn) determined by gel permeation chromatography (GPC) from 20,000 to 40,000; a z average molecular weight (Mz) from 240,000 to 360,000; an Mw/Mn from 2.9 to 4; an Mz/Mw from 2.9 to 3.2; and having a CBDI (50) from 80 to 95, the molecular weight distribution determined by GPC of said polymer being deconvoluted into at least two components comprising:
from 20 to 40 weight % of a first component having a calculated weight average molecular weight (Mw) being from 200,000 to 250,000; a calculated number average molecular weight from 90,000 to 135,000; a z average molecular weight 390,000 to 490,000 and an estimated density from 0.921 to 0.930 g/cc;
from 60 to 80 weight % of a second component having a calculated weight average molecular weight (Mw) being from 37,000 to 57,000; a calculated number average molecular weight (Mn) from 18,000 to 30,000; a z average molecular weight 60,000 to 85,000 and an estimated density from 0.948 to 0.953 g/cc, provided that the density difference between component two and component one is less than 0.030 g/cc.

2. The polyethylene resin according to claim 1, having a flex secant modulus 1% from 1200 to 1300 MPa.

3. The polyethylene resin according to claim 2, having a mean failure energy of not less than 150 ft·lb and a ductility not less than 80% as measured using low temperature ARM impact performance testing.

4. The polyethylene resin according to claim 3, comprising not less than 0.6 weight % of 1-octene.

5. The polyethylene resin according to claim 4, having an Mw/Mn from 2.5 to 4.5.

6. The polyethylene resin according to claim 5, having an Mz/Mw from 2.5 to 4.

7. The polyethylene according to claim 6, wherein the first component is present in an amount from 25 to 30 weight % of the total polymer composition.

8. A polyethylene resin comprising less than 1 weight % of 1-octene and the balance ethylene, having a density from 0.948 to 0.953 g/cc, a melt index determined according to ASTM1238 under a load of 2.16 kg at a temperature of 190° C. ($I_2$) from 1.0 to 1.5 g/10 minutes; a melt index determined according to ASTM1238 under a load of 21.6 kg at a temperature of 190° C. ($I_{21}$) from 32 to 55 g/10 minutes; a weight average molecular weight (Mw) determined by gel permeation chromatography from 90,000 to 130,000; a number average molecular weight (Mn) determined by gel permeation chromatography (GPC) from 20,000 to 40,000; a z average molecular weight (Mz) from 240,000 to 360,000; an Mw/Mn from 2.9 to 4; an Mz/Mw from 2.9 to 3.2; and having a CBDI (50) from 80 to 95, the molecular weight distribution determined by GPC of said polymer being deconvoluted into at least two components comprising:

from 20 to 40 weight % of a first component having a calculated weight average molecular weight (Mw) being from 170,000 to 265,000; a calculated number average molecular weight (Mn) from 90,000 to 140,000; a z average molecular weight 390,000 to 520,000 and an estimated density from 0.921 to 0.930 g/cc;

from 40 to 70 weight % of a second component having a calculated weight average molecular weight (Mw) being from 20,000 to 57,000; a calculated number average molecular weight (Mn) from 10,000 to 27,000; a z average molecular weight 30,000 to 72,000 and an estimated density from 0.948 to 0.953 g/cc, provided that the density difference between component two and component one is less than 0.030 g/cc; and from 3 to 20 weight % of a third component having a calculated weight average molecular weight (Mw) being from 60,000 to 130,000; a calculated number average molecular weight (Mn) from 30,000 to 65,000; a z average molecular weight 90,000 to 180,000 and an estimated density from 0.935 to 0.945 g/cc.

9. The polyethylene resin according to claim 8, having a flex secant modulus 1% from 1200 to 1300 MPa.

10. The polyethylene resin according to claim 9, having a mean failure energy of not less than 150 ft./lb. and a ductility greater than 80% as measured using low temperature ARM impact performance testing.

11. The polyethylene resin according to claim 10, having an environmental stress crack resistance of not less than 200 hours when measured at ESCR conditions A100 100% CO-630 and B100 100% CO-630.

12. The polyethylene resin according to claim 11, comprising not less than 0.6 weight % of 1-octene.

13. The polyethylene resin according to claim 12, having an Mw/Mn from 2.5 to 4.5.

14. The polyethylene resin according to claim 13, having an Mz/Mw from 2.5 to 3.5.

15. The polyethylene according to claim 14, wherein the first component is present in an amount from 25 to 40 weight % of the total polymer composition.

16. The polyethylene according to claim 15, wherein the second component is present in an amount from 45 to 65 weight % of the total polymer composition.

* * * * *